United States Patent [19]

Coulter

[11] Patent Number: 4,578,554
[45] Date of Patent: Mar. 25, 1986

[54] LASER WELDING APPARATUS

[75] Inventor: Leland E. Coulter, New Canaan, Conn.

[73] Assignee: Teledyne, Inc., New Canaan, Conn.

[21] Appl. No.: 605,279

[22] Filed: Apr. 30, 1984

[51] Int. Cl.⁴ .............................................. B23K 26/00
[52] U.S. Cl. ...................... 219/121 LC; 219/121 LU; 219/121 LV
[58] Field of Search .................. 219/121 LC, 121 LD, 219/121 LP, 121 LQ, 121 LR, 121 LU, 121 LV, 121 LW, 124.34; 901/47, 42; 364/474, 475

[56] References Cited

U.S. PATENT DOCUMENTS

| Re. 31,042 | 9/1982 | Clark et al. | 219/121 LG |
| 2,460,914 | 2/1949 | Wright | 219/124.22 |
| 2,646,493 | 7/1953 | Moon | 219/124.22 |
| 2,818,494 | 12/1957 | Bernard et al. | 219/125.1 |
| 3,031,566 | 4/1962 | Wuesthoff | 219/125.1 |
| 3,109,921 | 11/1963 | Anderson | 219/124.34 |
| 3,207,407 | 9/1965 | Preston et al. | 219/124.34 |
| 3,382,343 | 5/1968 | Muncheryan | 219/121 LC |
| 3,502,882 | 3/1970 | von Voros | 250/202 |
| 3,528,424 | 9/1970 | Ayres | 219/121 LV X |
| 3,535,488 | 10/1970 | Kitchin | 219/121 EB |
| 3,657,511 | 4/1972 | Friedman et al. | 219/125 |
| 3,821,510 | 6/1974 | Muncheryan | 219/121 LV |
| 3,873,802 | 3/1975 | Sciaky | 219/121 EB |
| 3,986,767 | 10/1976 | Rexer et al. | 219/121 LQ X |
| 4,115,684 | 9/1978 | Lindbom | 219/124.34 X |
| 4,201,905 | 5/1980 | Clark et al. | 219/121 L |
| 4,224,501 | 9/1980 | Lindbom et al. | 219/124.34 |
| 4,229,641 | 10/1980 | Ihara | 219/125.1 |
| 4,258,425 | 3/1981 | Ramsey et al. | 219/124.34 |
| 4,335,296 | 6/1982 | Bredow | 219/121 LG |
| 4,371,105 | 2/1983 | Melton | 219/125.1 |
| 4,380,696 | 4/1983 | Masaki | 219/124.34 |
| 4,461,947 | 7/1984 | Ward | 219/121 LU X |

FOREIGN PATENT DOCUMENTS 0021491  2/1984  Japan .......................... 219/121 LQ

OTHER PUBLICATIONS

Metalworking News, Nov. 28, 1983, Coherent Times, vol. 102, Jan. 1984, "High Power Lasers Meet The Challenge".

*Primary Examiner*—C. L. Albritton
*Attorney, Agent, or Firm*—St. Onge Steward Johnston & Reens

[57] ABSTRACT

A welding head is mounted for movement relative to a fixed base about a plurality of axes. A laser beam, is transmitted from a laser generator to the welding head by an axially flexible but torsionally rigid transmission tube including one or more optically transmitting fibers. The transmission tube is rotatably mounted on the welding head for free rotation about the axis of the emitted laser beam. A lens or other focusing means is provided to focus the laser beam relative to the workpiece, and moving means is provided to move the welding head relative to the laser generating means and the fixed base. A mini-computer or other control means allows control of the moving means to direct the laser beam along the workpiece in a predetermined path. An apertured hood provides protection for the focusing means, and an optional removable probe member provides assistance in programming the apparatus.

18 Claims, 4 Drawing Figures

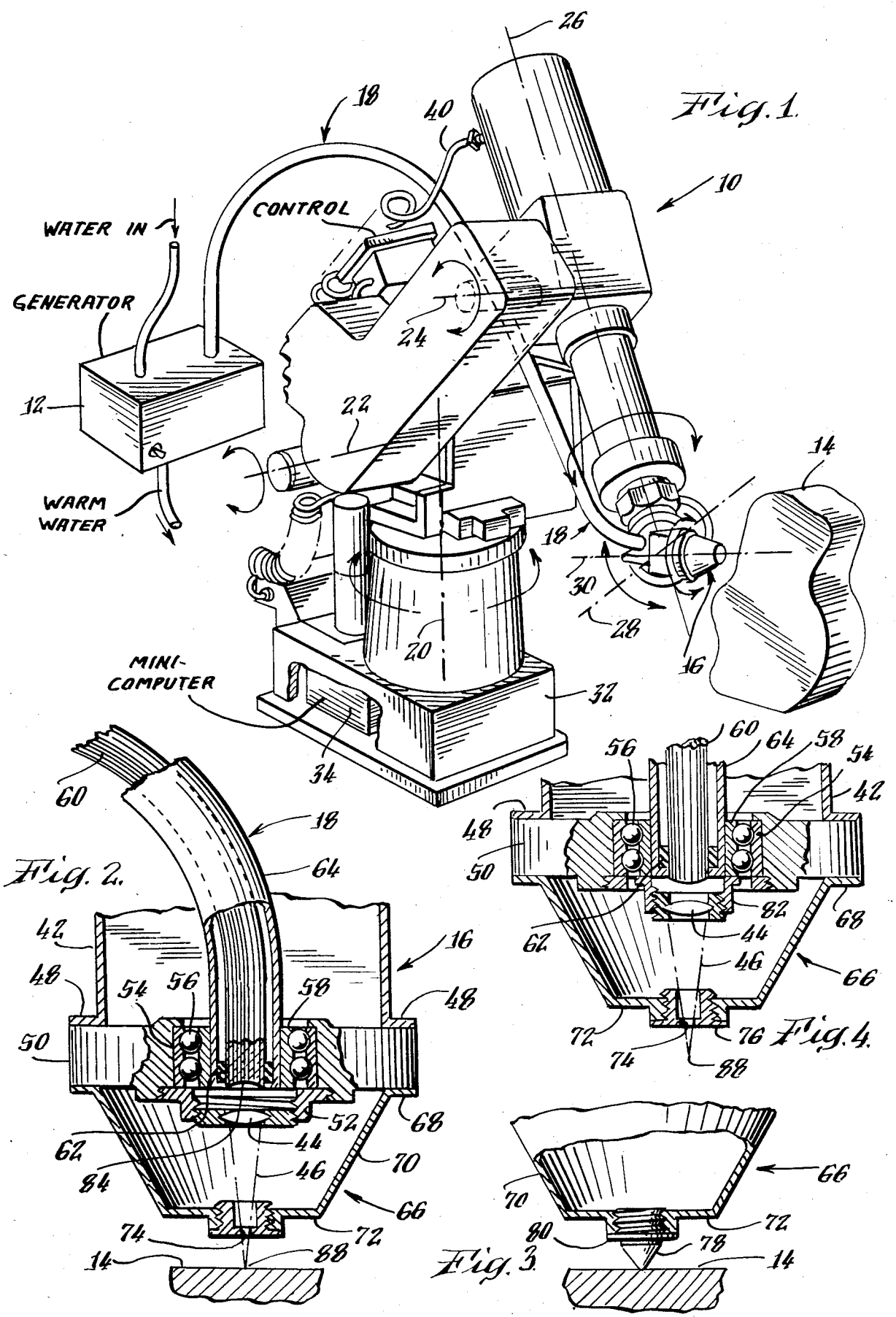

LASER WELDING APPARATUS

BACKGROUND OF THE INVENTION

This invention relates to an automatic welding, cutting, or treating apparatus, and, more particularly, to a robot controlled laser head for welding, cutting, or treating of various materials.

It is generally recognized that, for many purposes, laser beams can provide improved welding, cutting, and treating of various materials. For example, cuts produced by laser beams are generally characterized by a narrow kerf, reduced warpage and decreased risk of fracture of a workpiece, due primarily to the relatively small amount of heat energy absorbed during the cutting operation. These characteristics are particularly significant in the welding, cutting, and treating of high temperature metal alloys.

Also, the use of laser beams for welding, cutting, and treating can result in substantial reductions in hard tooling costs. For example, various workpieces may be placed in a universal fixture and the laser beam then manipulated by a robot or other automatic means. If the robot is capable of recalling programs for each of the various workpieces, the setup does not require changing from workpiece to workpiece. Therefore, short production runs become more cost effective.

However, the use of lasers for industrial purposes has been severally limited by the size and weight of the laser generator required to generate a suitable laser beam for cutting or welding, partly due to the requirements for cooling. For that reason, it has generally been necessary to mount the laser generator in a relatively fixed position and move the workpiece with respect to the laser generator rather than move the laser generator with respect to the workpiece. Such a manipulation of the workpiece is difficult and becomes increasingly impractical as the workpiece becomes larger and heavier.

There has been some experimentation with the use of a flexible fiber-optics tube to transmit a laser beam from a fixed laser generator to a manipulable arm for moving the laser beam relative to a workpiece. However, these uses have been limited to relatively low power laser generators and have been applied primarily to medical applications. Such laser devices have not utilized robots for automatic operation and have not been capable of being scaled up in size for use in industrial applications.

One of the difficulties in employing a flexible fiber-optics tube in an industrial application is the loss of power which results if the tube is subjected to any degree of torsion. No coherent light is transmitted if the fiber-optics tube is twisted. If the laser beam goes "off heat" during welding or cutting, for example, the seam or cut may have an unacceptable discontinuity, causing rejection of the workpiece. For that reason, among others, such a laser-powered device employing a fiber-optics tube in industrial operations has not been practical.

Another problem encountered in using a laser-powered device in industrial applications has been the vulnerability of the lens or other means for focusing the laser beam onto the workpiece. If the lens is jarred out of its precise alignment or is masked by even the slightest amount of dirt, the power of the laser beam will be greatly diminished, further complicating automatic operation. This problem is particularly acute in those industrial environments in which dust and debris are generated.

A need exists for an apparatus which can direct a sufficiently powerful focused laser beam along a desired path relative to a fixed workpiece for performing industrial welding, cutting, or treating of various materials, including high temperature metals. The device should be capable of automatic operation for accurate repetitive performance of industrial operations. And, the device should avoid the expense and bulk of a device in which the laser generator itself is moved over the surface of the workpiece.

Accordingly, it is therefore an object of the present invention to provide an economical apparatus for directing a focused laser beam from a fixed laser generator along a desired path relative to a fixed workpiece, the laser beam being of a sufficient strength to effect commercial welding, cutting, or treating of the workpiece. It is a further object of the present invention to provide such welding, cutting, or treating of the workpiece in an automated manner facilitating low cost, industrial applications.

SUMMARY OF THE INVENTION

The present invention is directed to a welding, cutting, or treating apparatus having a fixed base and a welding head mounted on the base for movement about a plurality of axes. A flexible fiber-optics transmission means is provided for transmitting a laser beam from a laser generating means, which may be fixed, to the welding head for emission therefrom. The fiber-optics transmission means is rotatably mounted on the welding head for free rotation about the axis of the emitted laser beam so as to substantially reduce torsion of the fiber-optics transmission means.

Focusing means on the welding head is provided for focusing the laser beam to a focal point, and moving means is provided for moving the welding head relative to the base about the plurality of axes. Control means, which may include a mini-computer, is provided for controlling the moving means such that the focal point of the laser beam is directable along the workpiece in a predetermined path.

According to one aspect of the present invention, the welding, cutting, or treating apparatus includes an apertured hood for protecting the focusing means and for removably mounting a probe means that can be used in programming the apparatus for automatic operation. The probe means has a predetermined effective length corresponding to a desired distance between the welding head and the workpiece for assistance in positioning the welding head in a desired position by placing the probe means against the surface of the workpiece.

The invention, together with further objects and attendant advantages, will be best understood by reference to the following detailed description of the preferred embodiments taken in conjunction with the accompanying drawings.

BRIEF DESCRIPTION OF THE DRAWINGS

FIG. 1 is a pictorial view of the apparatus of the present invention showing a typical industrial application;

FIG. 2 is an enlarged sectional view of the welding head of the apparatus of FIG. 1;

FIG. 3 is an enlarged partial sectional view of the welding head of the apparatus of FIG. 1, showing the installation of a removable probe member; and FIG. 4 is a sectional view similar to that of FIG. 2, showing a second preferred embodiment of the invention.

DETAILED DESCRIPTION OF THE PREFERRED EMBODIMENTS

Turning now to the drawings, FIG. 1 shows a multiple axes robot, indicated generally by the numeral 10, a laser generator 12, and a workpiece 14. A welding head, indicated generally by the numeral 16, is mounted on an extension of the robot 10, and is connected to the laser generator 12 by a transmission tube, indicated generally by the numeral 18.

The robot 10 may have any number of axes, depending on the complexity of the shape of the workpiece 14 and the nature of the operations to be performed. The robot 10 illustrated in FIG. 1 has six axes for movement of the welding head 16, thus allowing the welding head to reach all surfaces of a complex part. A first axis 20 provides movement corresponding to the twisting of a man's waist, a second axis 22 provides movement corresponding to the bending of a man's back, a third axis 24 provides movement corresponding to the rotation of a man's shoulder, a fourth axis 26 provides movement corresponding to the flexing of a man's elbow, a fifth axis provides movement corresponding to the bending of a man's wrist, and a sixth axis provides movement correspondingto the rotation of a man's wrist.

The robot has a fixed base 32 which houses a mini-computer 34 for providing programmed, automatic operation of the robot 10. A control panel 36 is provided at a convenient height on the side of the robot 10 opposite the welding head 16. The control panel 36 is joined to the mini-computer 34 and the moving means of the robot 10 by electrical cables 38 and 40, as shown. Such robots are generally available and, for that reason, further details of the robot 10 are not required for an understanding of the present invention.

Preferably, the laser generator 12 is fixed to the base 32 of the robot 10, thereby reducing the mass which the robot 10 must move. Alternatively, the laser generator 12 may be fixed to an intermediate member of the robot, e.g. that corresponding to a man's waist, to reduce flexing of the transmission tube 18. Of course, such intermediate mounting of the laser generator 12 is largely dependent upon its size and weight.

The welding head 16 has a unique configuration, shown in FIG. 2, adapted for rotatable mounting of the transmission tube 18 and for adjustable mounting of a lens 44 for focusing a laser beam 46 emitted from the transmission tube 18. As shown, a housing 42, fixed to the arm of the robot 10, includes a mounting flange 48 to which a faceplate 50 is secured by conventional means. The transmission tube 18 enters the housing 42 through an aperture, not shown.

The faceplate 50 has a threaded recess for receiving an adjustable lens mount 52 which permits adjustment of the lens 44 along the axis of the laser beam 46 to control the focus of the laser beam 46. In addition, the faceplate 50 has a recess for rotatably mounting an outer bearing race 54.

Preferably, the rotatable mounting of the transmission tube 18 includes roller bearing means such as ball, cone, cylinder, or needle bearings. In the embodiment shown, ball bearings 56 are retained in a double row between the outer bearing race 54 and an inner bearing race 58 which is secured to the outer surface of the transmission tube 18. A fiber-optics tube 60 is accurately located within the transmission tube 18 by means of a locating ring 62 which provides a closure for a water passage within the transmission tube 18. A torsionally rigid water jacket 64 forms the outside of the transmission tube 18.

A protective hood, indicated generally by the numeral 66, is mounted upon the faceplate 50 along the perimeter of the protective hood 66 by a mounting flange 68. The protective hood 66 includes depending converging side walls 70 terminating in a bottom wall 72. The bottom wall 72 has an aperture in alignment with the axis of the laser beam 46 of sufficient size to permit the laser beam 46 to be directed therethrough while providing maximum protection for the lens 44 and the adjustable lens mount 52.

Preferably, the aperture 74 is provided within a removable threaded plug 76, as shown in FIG. 2. This construction facilitates the mounting of an optional removable probe member 78 for operation of the apparatus in a programming mode, described below. Because the aperature 74 is typically in the range of 0.060 inches, a size somewhat too small for securely mounting a rugged probe member, the threaded plug 76 ensures a greater surface area of the threads for mounting the probe member 78. In addition, the threaded plug 76 protects the thread surfaces from debris and damage when the apparatus is in the welding or cutting modes.

As shown in FIG. 3, the probe member 78 has a rugged conical construction including a locating shoulder 80 ensuring that the tip of the probe member 78 is positioned a predetermined distance from the protective hood 66. The effective length of the probe member 78 is determined as described below. Typically, the protective hood 66 has a length of approximately 4.0 inches, the focal length is approximately 6 inches, and the effective length of the probe-member 78 is approximately 2.0 inches.

A second embodiment, shown in FIG. 4, differs only in the mounting of the lens 44. Instead of mounting the lens 44 on the faceplate 50 by means of the adjustable lens mount 52, the lens 44 is mounted by means of an adjustable lens mount 82 fixed to the inner bearing race 58 such that the lens 44 is rotatably movable with the fiber-optics tube 60. This second embodiment ensures that no change in the focal length occurs as the transmission tube 18 is rotated with respect to the welding head 16. However, in this second embodiment, the amount of mass rotated with respect to the welding head 16 is increased and the ball bearings 56 are more exposed.

The fiber-optics tube 60 may comprise a single fiber or a bundle of multiple fibers and typically has an overall diameter within the range of ⅛ to ¼ inch, exclusive of the water jacket 64. Preferably, the fiber-optics tube 60 is a stack of multiple fibers having a hexagonal section arranged to a generally round overall section. The end of the fiber-optics tube 60 may be ground to a concave termination 84, as shown in FIG. 2, or to a convex termination 26, as shown in FIG. 4, to provide a lens complementary to the lens 44 for focusing the laser beam 46 to a focal point 88. The lens 44 is advantageously of multiple elements and may typically have six or more elements.

Preferably, the laser generator 12 employs a YAG (Yttrium Arsenic Germanium) laser, which allows a substantial reduction in weight and size relative to laser generators employing a $CO_2$ laser. A suitable laser generator, manufactured by Raytheon of Burlington, Mass., is water cooled, weighs approximately 120 lbs. and is of a convenient size, approxmately 8×5×42 inches. The transmission tube 18 and laser generator 12 may use the same coolant supply. The transmission tube 18 may include a separate tube, not shown, for return flow to the coolant supply from the welding head 16.

The unique rotatable mounting of the transmission tube 18 within the welding head 16, combined with the torsional stiffness of the transmission tube 18, ensures that the fiber-optics tube 60 is free of torsional movement as the robot 10 moves the welding head 16 throughout a full range of motion. In this way, the present invention overcomes the problems described above, of loss of heat due to twisting of a fiber-optics transmission tube. This particular mounting of the transmission tube 18 also provides the necessary precision of location of the laser beam 46 to allow accurate welding or cutting within tight tolerances.

The optional probe member 78 may be employed in programming the robot for automatic operation of the welding head for a particular workpiece. For example, if, it is desired that the laser beam 46 be directed against the workpiece 14 normal to the surface such that the focal point 88 is 0.005 inches below the surface for cutting, the probe member 78 is threadably mounted, perhaps with the aid of spacer washers or other adjustment, such that the conical tip of the probe member 78 projects 0.005 inches less than the focused laser beam 46. The probe member 78 is then manipulated along the surface of the workpiece 14 such that the welding head 16 follows the desired cutting line and remains normal to the surface of the workpiece 14. During this motion, the mini-computer 34 is activated for sensing the transient positions of the welding head 16 and for recording those positions for subsequent recall to automatically duplicate the programming motion of the welding head 16.

Similarly, the welding head 16 can be programmed to direct the laser beam 46 obliquely against the workpiece to result in a desired welding puddle flow. Also, the welding head 16 can be programmed to feed the laser beam 46 inwardly as the beam is cutting to maintain a constant working distance, again with the aid of the optional probe member 78. And, the welding head 16 can be programmed to automatically effect a desired heat treatment by reducing the power of the laser beam 46 or by changing the focus of the lens 44 or by moving the focal point 88 above or below the surface of the workpiece 14.

Several commercially available robot products are suitable for use with the laser welding apparatus of the present invention. A model $T^3$-726 industrial robot manufactured by Cincinnati Milacron's Industrial Robot Division, Lebanon, Ohio has six axes, a horizontal reach of 41 inches, positioning repeatability of 0.004 inches, and a memory capacity of 3,000 points. Such a robot is easily adapted to the programming needs of the robot 10 when equipped with the welding head 16, transmission tube 18, and optional probe member 78. The model $T^3$-726 includes a mini-computer programmed to sense the transient position of the robot arm and compare that transient position to a predetermined path to provide input for automatic control of the moving means of the robot.

For welding or cutting, the welding head 16 may be provided with a nozzle or jacket to direct a flow of gas to the surface being welded or cut. Preferably, gas cylinders holding several different gases (argon, oxygen, etc.) are connected to the welding head 16 through a manifold to allow a particular gas to be selected for a specific operation on the workpiece 14. The selection of the desired gas is, preferably, a part of the robot's program to enhance automation of the operation. Other parameters which are controlled by the minicomputer 34 are the laser pulse length, the laser pulse rate, and the gas flow rate.

From the foregoing, it should be apparent that the present invention provides an economical apparatus capable of automatically directing a powerful laser beam from a laser generator, which may be fixed to the base of the apparatus, against the surface of a workpiece along a predetermined path. The particular structure of the transmission tube 18 and the rotatable mounting of the tranmission tube 18 within the welding head 16 ensure that the power of the laser beam is not diminished by torsional movement of the transmission tube. This construction allows the welding head 16 to be manipulated precisely over a workpiece having a complex configuration, thereby reducing hard tooling costs.

The apparatus includes a protective hood allowing the apparatus to function efficiently in an industrial environment without risking damage or contamination of the focusing means for the laser beam and without impeding movement of the welding head. The protective hood also contains the laser beam in the event of any failure of the transmission tube 18 or of the pivotal mounting of the transmission tube 18 to ensure safe operation of the apparatus.

The present invention substantially reduces the amount of mass which must be rotated relative to the welding head 16. This facilitates the free rotation of the fiber-optics tube and reduces the torsional loading on the transmission tube 18 when the welding head 16 is moved over the surface of the workpiece 14. The present invention also provides optional probe means 78 to facilitate programming of the apparatus to duplicate a particular desired movement of the welding head 16 relative to the workpiece 14.

It should be understood that the term "welding" as used in the claims herein also includes laser cutting or treating apparatus. It should also be understood that various changes and modifications to the preferred embodiments described above will be apparent to those skilled in the art. Such changes and modifications can be made without departing from the spirit and scope of the present invention, and it is therefore intended that such changes and modifications be covered by the following claims.

What is claimed is:

1. A laser welding apparatus, comprising:
   a base;
   a welding head mounted on the base for movement about a plurality of axes;
   laser generating means;
   optical fiber transmission means for transmitting a laser beam from the laser generating means to the welding head for emission therefrom, the optical fiber transmission means being rotatably mounted on the welding head for free rotation about the axis of the emitted laser beam so as to reduce torsion of the optical fiber transmission means when the welding head is moved; and
   focusing means on the welding head for focusing the laser beam to a focal point.

2. The apparatus of claim 1 wherein the optical fiber transmission means includes at least one fiber-optics tube.

3. The apparatus of claim 2 wherein the focusing means is a lens fixed to the welding head, the fiber-optics tube being free to rotate with respect to the lens.

4. The apparatus of claim 2 wherein the focusing means is a lens fixed with respect to the fiber-optics tube and is free to rotate with the fiber-optics tube with respect to the welding head.

5. The apparatus of claim 1 further comprising probe means removably mounted on the welding head, the probe means having a predetermined effective length corresponding to a desired distance between the welding head and the workpiece for positioning the welding head by placing the probe means against the surface of the workpiece.

6. The apparatus of claim 5 further comprising a protective hood mounted on the welding head for providing protection for the focusing means and wherein the probe means is removably mounted upon the protective hood.

7. A laser welding apparatus, comprising:
a fixed base;
a welding head mounted on the base for movement about a plurality of axes;
laser generating means;
fiber-optics transmission means connecting the laser generating means to the welding head for transmitting a laser beam to the welding head for emission therefrom, the fiber-optics transmission means being axially flexible but having torsional rigidity;
roller bearing means mounting the fiber-optics transmission means upon the welding head for free rotation of the fiber-optics transmission means about the axis of the emitted laser beam and for restricting the translation of the fiber-optics transmission means relative to the welding head; and
focusing means on the welding head for focusing the laser beam to a focal point.

8. The apparatus of claim 7 wherein the focusing means is a lens fixed to the welding head, the fiber-optics transmission means being free to rotate with respect to the lens.

9. The apparatus of claim 7 wherein the focusing means is a lens fixed with respect to the fiber-optics transmission means and is free to rotate with the fiber-optics transmission means with respect to the welding head.

10. The apparatus of claim 7 further comprising probe means removably mounted on the welding head, the probe means having a predetermined effective length corresponding to a desired distance between the welding head and the workpiece for positioning the welding head by placing the probe means against the surface of the workpiece.

11. The apparatus of claim 10 further comprising a protective hood mounted on the welding head for providing protection for the focusing means and wherein the probe means is removably mounted upon the protective hood.

12. The apparatus of claim 7 wherein the transmission means includes a torsionally rigid jacket enclosing a fiber-optics tube and providing a space for coolant therebetween, the jacket being rotatably mounted on the welding head for free rotation about the axis of the emitted laser beam.

13. The apparatus of claim 7 further comprising means for controlling the pulse rate and pulse duration of the laser generating means and for controlling the focusing means as the laser beam moves along the workpiece in a predetermined path.

14. A laser welding apparatus, comprising:
a fixed base;
a welding head mounted on the base for movement about six axes;
YAG laser generating means, fixed with respect to the base, for generating a laser beam;
fiber-optics transmission means for transmitting the laser beam from the layer generating means to the welding head for emission therefrom, the fiber-optics transmission means being rotatably mounted on the welding head for free rotation about the axis of the emitted laser beam so as to reduce torsion of the fiber-optics transmission means when the welding head is moved;
a lens fixed to the welding head for focusing the laser beam to a focal point;
protective hood means mounted on the welding head for protecting the lens while allowing the laser beam to be emitted therethrough; and
a probe member removably mounted on the protective hood means for positioning the welding head relative to the workpiece when the probe member is positioned against the workpiece, the probe member having a predetermined effective length corresponding to a desired distance between the welding head and the workpiece.

15. A laser welder comprising
a fiber-optics transmission means for connecting the welder to a laser generating means such that a laser beam may be transmitted from the laser generating means to the welder for emission therefrom, the fiber-optics transmission means being axially flexible but having torsional rigidity and including at least one optically transmitting fiber;
roller bearing means mounting the fiber-optics transmission means upon the welder for free rotation of the fiber-optics transmission means about the axis of the emitted laser beam and for restricting the torsion of the fiber-optics transmission means relative to the welder; and
focusing means on the welder for focusing the laser beam to a focal point.

16. The laser welder of claim 15 wherein the fiber-optics transmission means includes a torsionally rigid jacket enclosing a fiber-optics tube and providing a space for coolant therebetween, the jacket being rotatably mounted on the welder for free rotation about the axis of the emitted laser beam.

17. The laser welder of claim 15 further comprising a probe member removably mounted on the welder for positioning the welder relative to a workpiece when the probe member is positioned against the workpiece, the probe member having a predetermined effective length corresponding to a desired distance between the welder and the workpiece.

18. The laser welding head of claim 15 further comprising protective hood means mounted on the welding head for protecting the lens while allowing the laser beam to be emitted therethrough.

* * * * *